United States Patent
Azuma et al.

(10) Patent No.: US 8,967,751 B2
(45) Date of Patent: Mar. 3, 2015

(54) IMAGE PROCESSING APPARATUS AND IMAGE PROCESSING METHOD

(75) Inventors: Satoshi Azuma, Kawasaki (JP); Yoshiaki Murayama, Tokyo (JP); Shigeyasu Nagoshi, Yokohama (JP); Minoru Teshigawara, Saitama (JP); Susumu Hirosawa, Tokyo (JP); Yutaka Kano, Yokohama (JP); Takeshi Murase, Yokohama (JP); Kentarou Muro, Tokyo (JP); Masao Kato, Kawasaki (JP); Minako Kato, Kawasaki (JP); Tomokazu Ishikawa, Kawasaki (JP); Fumitaka Goto, Tokyo (JP); Mitsuhiro Ono, Tokyo (JP); Akitoshi Yamada, Yokohama (JP); Yugo Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 12/960,423

(22) Filed: Dec. 3, 2010

(65) Prior Publication Data

US 2011/0316921 A1 Dec. 29, 2011

(30) Foreign Application Priority Data

Jun. 24, 2010 (JP) ................................. 2010-144214

(51) Int. Cl.
*B41J 2/205* (2006.01)
*B41J 2/21* (2006.01)
*H04N 1/405* (2006.01)

(52) U.S. Cl.
CPC .............. *B41J 2/2056* (2013.01); *B41J 2/2146* (2013.01); *H04N 1/405* (2013.01)
USPC ................................... 347/15; 347/41; 347/42

(58) Field of Classification Search
USPC ................................................ 347/15, 41, 42
See application file for complete search history.

(56) References Cited

U.S. PATENT DOCUMENTS 6,511,143 B1 1/2003 Ishikawa et al.
2010/0053246 A1* 3/2010 Kasahara et al. ............... 347/12

FOREIGN PATENT DOCUMENTS

| JP | 05-057965 A | 3/1993 |
| JP | 2000-103088 A | 4/2000 |
| JP | 2006-192892 A | 7/2006 |
| JP | 2008-143065 A | 6/2008 |

* cited by examiner

*Primary Examiner* — Uyen Chau N Le
*Assistant Examiner* — Chad Smith
(74) *Attorney, Agent, or Firm* — Canon U.S.A., Inc. IP Division

(57) ABSTRACT

When an image is recorded using a multichip recording head including a plurality of chips each having a plurality of nozzle arrays, a change in image density can occur due to a registration error between chips in an overlapping part where two chips are connected. To suppress the change in image density, input image data is distributed to two chips such that there are dots overlapping each other between the two chips in the overlapping part.

14 Claims, 19 Drawing Sheets

CONVEYING DIRECTION →
FIG. 8A   FIG. 8B   FIG. 8C
600 dpi   1200 dpi
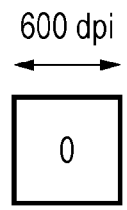
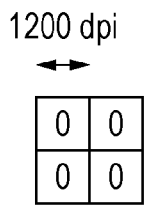
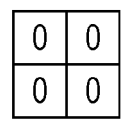
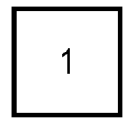
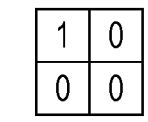
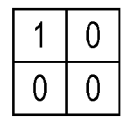
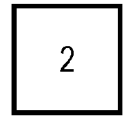
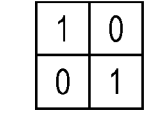
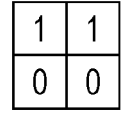
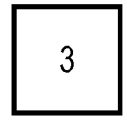
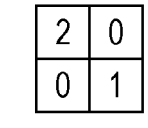
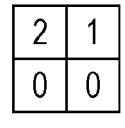
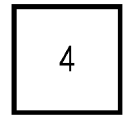
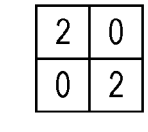
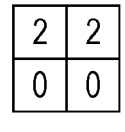
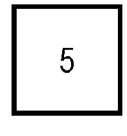
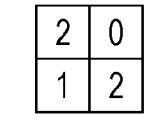
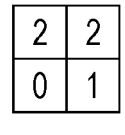
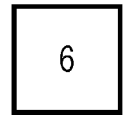
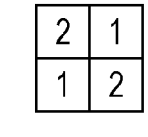
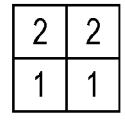
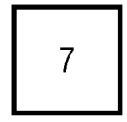

FIG. 9
CONVEYING DIRECTION →
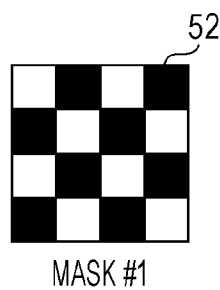
MASK #1
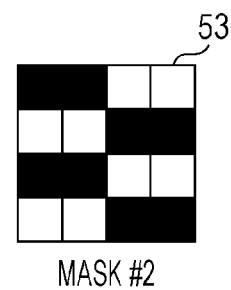
MASK #2
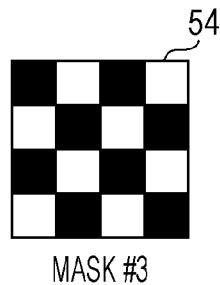
MASK #3
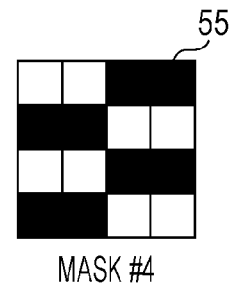
MASK #4

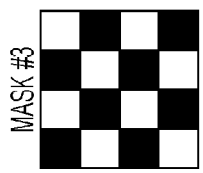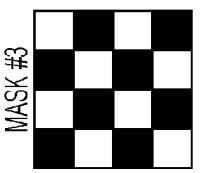

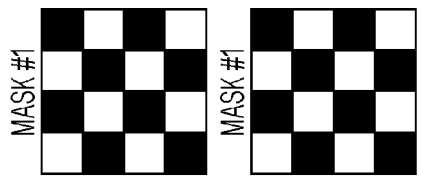

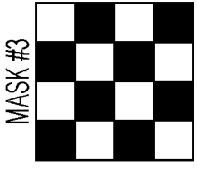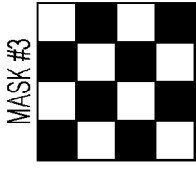

FIG. 18A

| | | | | | | | | | | | | | | | | | | | |
|---|---|---|---|---|---|---|---|---|---|---|---|---|---|---|---|---|---|---|---|
| FIRST CHIP | 4 | 4 | 4 | 4 | 4 | 4 | 4 | 4 | 4 | 0 | 4 | 0 | | | | | | | |
| | 4 | 4 | 4 | 4 | 4 | 4 | 4 | 4 | 0 | 4 | 0 | 4 | | | | | | | |
| | 4 | 4 | 4 | 4 | 4 | 4 | 4 | 4 | 4 | 0 | 4 | 0 | | | | | | | |
| | 4 | 4 | 4 | 4 | 4 | 4 | 4 | 4 | 0 | 4 | 0 | 4 | | | | | | | |

| | | | | | | | | | | | | | | | | | | | |
|---|---|---|---|---|---|---|---|---|---|---|---|---|---|---|---|---|---|---|---|
| SECOND CHIP | | | | | 0 | 4 | 0 | 4 | 4 | 4 | 4 | 4 | 4 | 4 | 4 | 4 | | | |
| | | | | | 4 | 0 | 4 | 0 | 4 | 4 | 4 | 4 | 4 | 4 | 4 | 4 | | | |
| | | | | | 0 | 4 | 0 | 4 | 4 | 4 | 4 | 4 | 4 | 4 | 4 | 4 | | | |
| | | | | | 4 | 0 | 4 | 0 | 4 | 4 | 4 | 4 | 4 | 4 | 4 | 4 | | | |

| SUPERIMPOSED | | | | | | | | | | | | | | | | | | | |
|---|---|---|---|---|---|---|---|---|---|---|---|---|---|---|---|---|---|---|---|
| 4 | 4 | 4 | 4 | 4 | 4 | 4 | 4 | 4 | 4 | 4 | 4 | 4 | 4 | 4 | 4 | 4 | 4 | 4 | 4 |
| 4 | 4 | 4 | 4 | 4 | 4 | 4 | 4 | 4 | 4 | 4 | 4 | 4 | 4 | 4 | 4 | 4 | 4 | 4 | 4 |
| 4 | 4 | 4 | 4 | 4 | 4 | 4 | 4 | 4 | 4 | 4 | 4 | 4 | 4 | 4 | 4 | 4 | 4 | 4 | 4 |
| 4 | 4 | 4 | 4 | 4 | 4 | 4 | 4 | 4 | 4 | 4 | 4 | 4 | 4 | 4 | 4 | 4 | 4 | 4 | 4 |

FIG. 18B

| | | | | | | | | | | | | | | | | | | | |
|---|---|---|---|---|---|---|---|---|---|---|---|---|---|---|---|---|---|---|---|
| FIRST CHIP | 4 | 4 | 4 | 4 | 4 | 4 | 4 | 4 | 4 | 0 | 4 | 0 | | | | | | | |
| | 4 | 4 | 4 | 4 | 4 | 4 | 4 | 4 | 0 | 4 | 0 | 4 | | | | | | | |
| | 4 | 4 | 4 | 4 | 4 | 4 | 4 | 4 | 4 | 0 | 4 | 0 | | | | | | | |
| | 4 | 4 | 4 | 4 | 4 | 4 | 4 | 4 | 0 | 4 | 0 | 4 | | | | | | | |

| | | | | | | | | | | | | | | | | | | | |
|---|---|---|---|---|---|---|---|---|---|---|---|---|---|---|---|---|---|---|---|
| SECOND CHIP | | | | | 0 | 4 | 0 | 4 | 4 | 4 | 4 | 4 | 4 | 4 | 4 | 4 | | | |
| | | | | | 4 | 0 | 4 | 0 | 4 | 4 | 4 | 4 | 4 | 4 | 4 | 4 | | | |
| | | | | | 0 | 4 | 0 | 4 | 4 | 4 | 4 | 4 | 4 | 4 | 4 | 4 | | | |
| | | | | | 4 | 0 | 4 | 0 | 4 | 4 | 4 | 4 | 4 | 4 | 4 | 4 | | | |

| SUPERIMPOSED | | | | | | | | | | | | | | | | | | | |
|---|---|---|---|---|---|---|---|---|---|---|---|---|---|---|---|---|---|---|---|
| 4 | 4 | 4 | 4 | 4 | 4 | 4 | 4 | 4 | 0 | 8 | 0 | 4 | 4 | 4 | 4 | 4 | 4 | 4 | 4 |
| 4 | 4 | 4 | 4 | 4 | 4 | 4 | 4 | 0 | 8 | 0 | 8 | 4 | 4 | 4 | 4 | 4 | 4 | 4 | 4 |
| 4 | 4 | 4 | 4 | 4 | 4 | 4 | 4 | 4 | 0 | 8 | 0 | 4 | 4 | 4 | 4 | 4 | 4 | 4 | 4 |
| 4 | 4 | 4 | 4 | 4 | 4 | 4 | 4 | 0 | 8 | 0 | 8 | 4 | 4 | 4 | 4 | 4 | 4 | 4 | 4 |

IMAGE PROCESSING APPARATUS AND IMAGE PROCESSING METHOD

BACKGROUND OF THE INVENTION

1. Field of the Invention

The present invention relates to an apparatus and method for processing multilevel image data used in recording an image using a recording head having an overlapping part in which a plurality of chips each having a plurality of nozzle arrays overlap each other in a direction crossing a direction in which the nozzle arrays are arranged, and more particularly to such an apparatus and a method for processing multilevel image data associated with the overlapping part.

2. Description of the Related Art

It is known to configure a recording apparatus to include a recording head, of a type called a multichip recording head, having a plurality of chips each including a plurality of nozzle arrays arranged in a zig-zap fashion. One type of recording apparatus using a multichip recording head is a serial recording apparatus in which the recording head is scanned in a direction crossing a direction in which recording elements are arranged while recording paper (a recording medium) is conveyed in the same direction as the direction in which the recording elements are arranged. Another type is a full line recording apparatus in which a recording head having nozzles (discharge ports) arranged over a length corresponding to a full recording width of recording paper is fixed, while the recording paper is conveyed in a direction perpendicular to the direction in which recording elements are arranged. In the full line recording apparatus, use of the recording head having nozzles (discharge ports) arranged over the length corresponding to the full recording width of recording paper (recording medium) makes it possible to continuously record an image with the width corresponding to the full recording width of the recording paper while conveying the recording paper, and thus high-speed recording is achieved.

However, the multichip recording head has some difficulties as described below. The multichip recording head has an overlapping part in which a plurality of chips overlap each other in a direction crossing the direction in which nozzles are arranged. In this overlapping part, chip-to-chip registration errors (errors in relative positions between dots) can occur due to various factors. The registration errors can cause unevenness in color density or unevenness in the form of grains in the overlapping part, which leads to degradation in image quality. Specific examples of factors that cause of the chip-to-chip registration error are a positioning error of chips in an assembling process, a conveying error of a recording medium, etc.

Japanese Patent Laid-Open No. 5-57965 discloses a method of reducing image defects in the form of streaks in the overlapping part of the multichip recording head by complimentarily increasing or decreasing a recording duty for respective chips in the overlapping part using a mask (hereinafter, the mask for this purpose will be referred to as a gradation mask).

Japanese Patent Laid-Open No. 2000-103088 discloses a technique of compensating for a registration error by converting image data so as to enhance "robustness" to a registration error between paths in a multipath recording process. Note that "robustness" refers to resistance against density evenness caused by various errors. According to the description of Japanese Patent Laid-Open No. 2000-103088, a change in image density can occur depending on various recording conditions. In particular, a change in image density can occur when there is a perfect complementary relationship between two pieces of image data corresponding to different recording scanning paths. Japanese Patent Laid-Open No. 2000-103088 discloses a technique to produce image data corresponding to different recording scanning paths such that there is less complementary relationship thereby achieving a high "robustness" in the multipath recording process.

More specifically, in the technique disclosed in Japanese Patent Laid-Open No. 2000-103088, multilevel image data is divided into a plurality of pieces of multilevel data for a plurality of planes before binarization is performed, and the plurality of pieces of divided multilevel data are independently binarized. This makes it possible to prevent a significant change in image density from occurring even when there is a shift in recording locations of image data between different recording scanning paths. As for supplementary explanation, in a case where original image data is divided in a plurality of pieces of image data corresponding to a plurality of recording scanning paths or a plurality of nozzle arrays, the original image data can be regarded as superposition of the plurality of pieces of image data produced via the dividing. In this situation, each piece of image data can be regarded as being in one plane. In the technique disclosed in Japanese Patent Laid-Open No. 2000-103088, one recording scanning path corresponds to one plane.

SUMMARY OF THE INVENTION

Although Japanese Patent Laid-Open No. 2000-103088 discloses the technique that allows it to reduce the change in image density even when there is a registration error between paths, Japanese Patent Laid-Open No. 2000-103088 does not disclose any technique to reduce a change in image density that occurs in an overlapping part of a multichip recording head.

In recent years, it has been proposed to configure a recording head to include a plurality of chips each having a plurality of nozzle arrays. However, Japanese Patent Laid-Open No. 2000-103088 does not disclose any technique to reduce a change in image density that occurs in an overlapping part of a multichip recording head of such a type.

In view of the above, the present invention provide a technique to reduce a change in image density due to a registration error in an overlapping part of a multichip recording head.

According to an aspect of the present invention, there is provided an image processing apparatus configured to process input image data used in recording an image on a recording medium by using a recording head while moving a relative position between the recording head and the recording medium, the recording head including a first chip and a second chip each having a plurality of nozzle arrays from which to discharge ink, the first chip and the second chip being disposed such that there is an overlapping part where the first chip and the second chip overlap each other in a direction crossing a direction in which nozzles are arranged, the processing being performed on image data associated with the overlapping part, the image processing apparatus including a distribution unit configured to distribute the input image data such that a part of the input image data to be applied to the overlapping part is distributed among the plurality of nozzle arrays of the first chip and the second chip, wherein the distribution unit distributes the input image data such that at at least one or more gray levels of the input image data there are dots overlapping each other between the first chip and the second chip when dots are recorded.

According to another aspect of the present invention, there is provided an image processing method of processing input image data used in recording an image on a recording medium by using a recording head while moving a relative position between the recording head and the recording medium, the recording head including a first chip and a second chip each having a plurality of nozzle arrays from which to discharge ink, the first chip and the second chip being disposed such that there is an overlapping part where the first chip and the second chip overlap each other in a direction crossing a direction in which nozzles are arranged, the processing being performed on image data associated with the overlapping part, the image processing method including distributing the input image data to be applied to the overlapping part among the plurality of nozzle arrays of the first chip and the second chip, wherein the distributing of the input image data is performed such that at at least one or more gray levels of the input image data there are dots overlapping each other between the first chip and the second chip when dots are recorded.

As described above, the present invention makes it possible to reduce a change in image density due to a registration error in an overlapping part of a multichip recording head.

Further features of the present invention will become apparent from the following description of exemplary embodiments with reference to the attached drawings.

BRIEF DESCRIPTION OF THE DRAWINGS

FIGS. 8A to 8C are diagrams illustrating a process performed by an indexing unit.

FIG. 9 is a diagram illustrating masks applied to respective nozzle arrays in an overlapping part.

FIGS. 11A to 11E are diagrams illustrating a masking process associated with a first chip.

FIGS. 12A to 12E are diagrams illustrating a masking process associated with a second chip.

FIGS. 14A and 14B are diagrams illustrating locations of dots recorded when there is a registration error between chips.

FIGS. 16A to 16E are diagrams illustrating a masking process associated with a first chip in a comparative example.

FIGS. 17A to 17E are diagrams illustrating a masking process associated with a second chip in a comparative example.

FIGS. 18A and 18B are diagrams illustrating locations of dots recorded when there is a registration error between chips in a comparative example.

DESCRIPTION OF THE EMBODIMENTS

The present invention is described in further detail below with reference to embodiments. In the embodiments described below, it is assumed by way of example that the recording apparatus is of an ink-jet type. Note that the present invention is not limited to the ink-jet recording apparatus, but the present invention may be applied to other recording apparatuses configured to record an image on a recording medium by forming dots thereon using a recording head while moving a relative positions between the recording medium and the recording head.

First Embodiment

Figure 1:
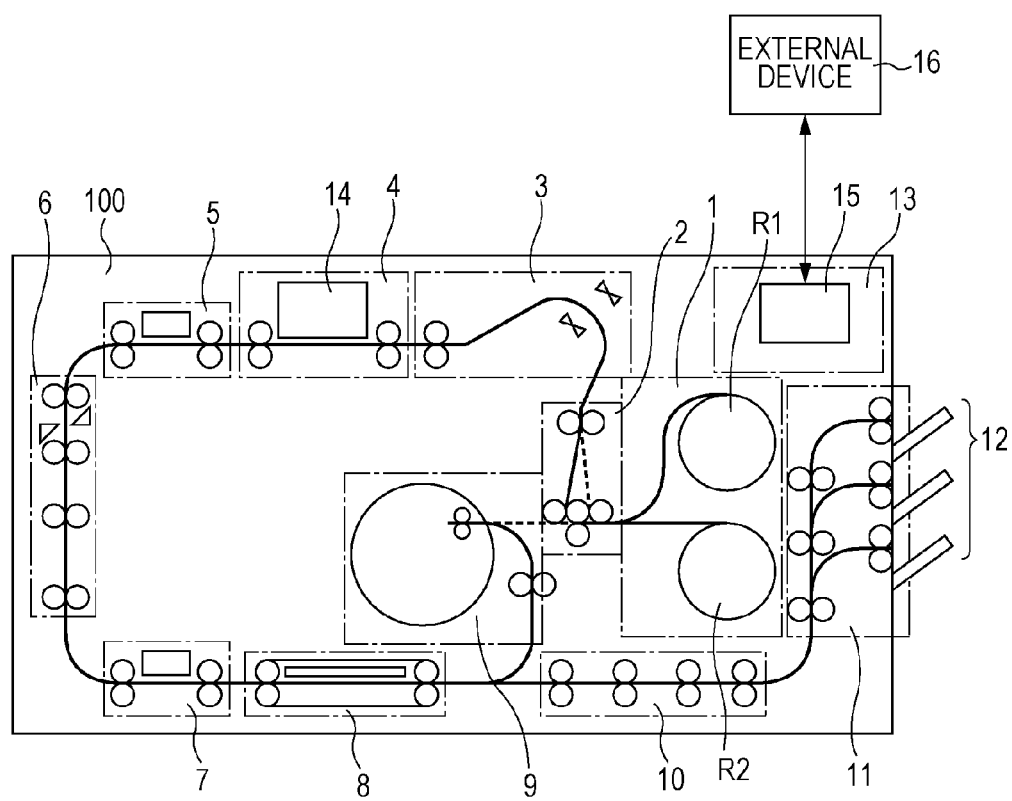
FIG. 1 is a schematic diagram illustrating an ink-jet recording apparatus according to an embodiment of the present invention.

FIG. 1 is a schematic diagram of an ink-jet recording apparatus (hereinafter, also referred to as a recording apparatus or a printer) according to an embodiment of the present invention. The printer 100 shown in FIG. 1 is of an ink-jet type configured to perform recording by discharging ink from a recording head while moving the recording head relative to a recording medium. The printer 100 has various units including a sheet feeding unit 1, a decurling unit 2, a skew correcting unit 3, a printing unit 4, an inspecting unit 5, a cutting unit 6, an information recording unit 7, a drying unit 8, a sheet winding unit 9, a discharge conveying unit 10, a sorting unit 11, output trays 12, and a control unit 13. A recording medium (sheet) is conveyed by a conveying mechanism including a roller pair, a belt, etc. along a sheet conveying path represented by a solid line in FIG. 1. While the recording medium is conveyed, the recording medium is subjected to various processes by the units.

The sheet feeding unit 1 is a unit that contains a continuous sheet in the form of roll put therein and feeds the sheet. In the sheet feeding unit 1, two rolls R1 and R2 can be put. A sheet is drawn and fed from a selected one of the two rolls R1 and R2. The number of rolls allowed to be put in the sheet feeding unit 1 is not limited to two, but the sheet feeding unit 1 may be configured to put one roll or three or more rolls. The decurling unit 2 is a unit that reduces curl of the sheet fed from the sheet feeding unit 1. More specifically, the decurling unit 2 reduces curl of the sheet by bending the sheet in a direction opposite to the curling direction using a combination of one driving roller and two pinch rollers. The skew correcting unit 3 is a unit that corrects skew (a wrong direction in which the sheet is conveyed) of the sheet after the sheet has passed through the decurling unit 2. The skew is corrected by urging a reference side edge of the sheet against a guide member.

The printing unit 4 is a unit that forms an image on the sheet being conveyed using the recording head 14. The printing unit 4 includes a plurality of conveying rollers to convey the sheet. The recording head 14 is of the full line type having nozzles arranged over a range corresponding to a maximum width of sheets. A plurality of recording heads are arranged side by side in a conveying direction. In the present embodiment, there are seven recording heads responsible for seven colors, i.e., Bk (black), Lc (light cyan), Lm (light magenta), Gy (gray), Y (yellow), M (magenta), and C (cyan). Ink may be discharged from nozzles by many methods such as a method using heating elements, a method using piezoelectric elements, a method using electrostatic elements, a method using MEMS elements, etc. Ink of each color is supplied to a corresponding recording head from a corresponding ink tank via an ink tube.

The inspecting unit 5 is a unit that optically reads a test pattern or an image printed on the sheet by the printing unit 4 and examines a state of nozzles of the recording head, a state of a sheet conveying system, an image location, etc. The cutting unit 6 has a mechanical cutter for cutting the sheet into a particular size after the printing is performed. The cutting unit 6 has a plurality of conveying rollers to convey the sheet to a location at which the sheet is to be subjected to a next process. The information recording unit 7 is a unit that records print information such as a print serial number, a date/time, etc. on a second (back) side of the cut sheet. The drying unit 8 is a unit that heats the sheet printed by the printing unit 4 to quickly dry the ink applied to the sheet. The drying unit 8 has a conveying belt and a conveying roller to convey the sheet to a location at which the sheet is to be subjected to a next process.

The sheet winding unit 9 is a unit that temporarily winds the continuous sheet after the printing on a first side of the sheet is completed in a duplex printing mode. The sheet winding unit 9 has a winding drum that rotates to wind the sheet. After the printing on the first side is completed, the continuous sheet is temporarily wound by the winding drum without being cut. After the winding is completed, the winding drum rotates in an opposite direction to feed the sheet from the winding drum to the decurling unit 2 and further to the printing unit 4. In this state, the sheet is in an upside-down state, and thus printing by the printing unit 4 is performed on the back surface of the sheet. The operation in the duplex printing mode will be described in further detail later.

After the sheet is cut by the cutting unit 6 and dried by the drying unit 8, the cut sheets are conveyed by the discharge conveying unit 10 to the sorting unit 11. The sorting unit 11 is a unit that classifies the printed sheets into groups and discharges the classified sheets onto particular output trays 12 depending on the groups. The control unit 13 is a unit that controls various units in the printer.

Figure 2:
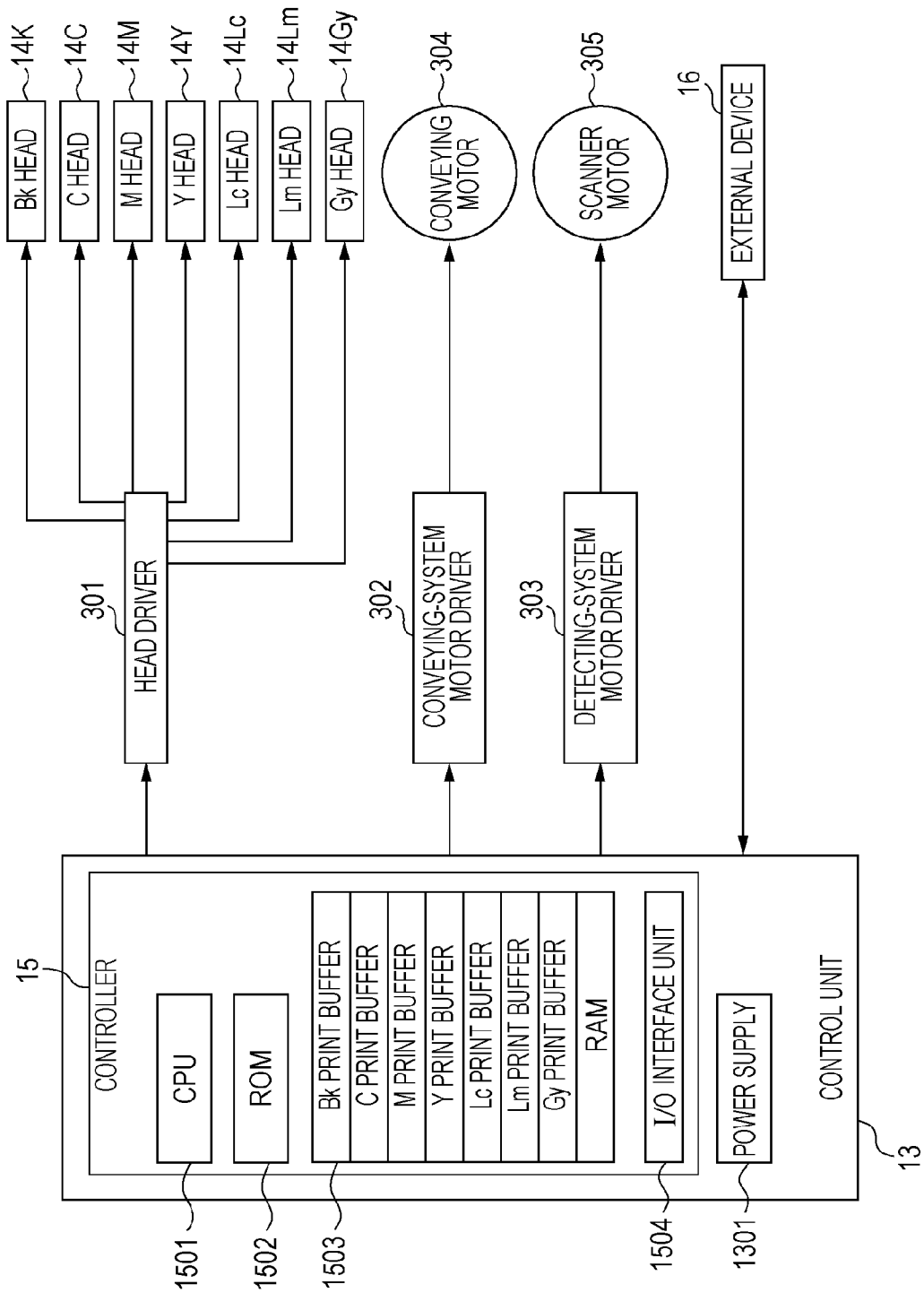
FIG. 2 is a block diagram illustrating a control circuit of an ink-jet recording apparatus.

FIG. 2 illustrates control blocks of the printer. The control unit 13 includes a power supply 1301 and a controller 15 including a CPU 1501, a ROM 1502, a RAM 1503, and an I/O interface 1504. The operation of the printer is controlled by the controller 15 or an external device 16 such as a host computer connected to the controller 15 via the I/O interface 1504.

If a signal is received from the external device 16, the controller 15 produces recording data to be recorded on a sheet S by the recording head. The produced recording data is stored in the RAM 1503 serving as a print buffer. The data stored in the print buffer is transferred to the head driver 301. The head driver 301 converts the received data into data according to which to discharge ink from the recording heads of the respective colors. The recording heads record an image in accordance with the data. As described above, the controller 15 has the function of processing image data. The image processing performed according to the present embodiment will be described in further detail later.

The controller 15 controls various motor drivers including a conveying-system motor driver 302, a detecting-system motor driver 303, etc. to activate driving sources such as a conveying motor 304 or a scanner motor 305 thereby conveying the sheet, performing a detecting operation, etc.

Figure 3A:
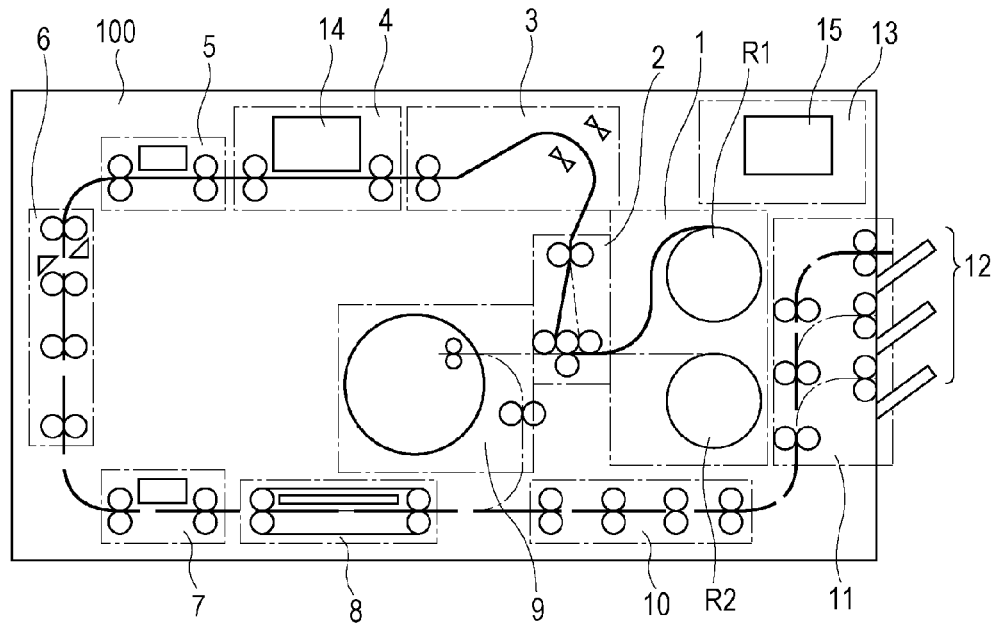
FIGS. 3A and 3B are diagrams provided for an explanation of a printing operation performed by an ink-jet recording apparatus.

Next, a basic printing operation is described below. The printing operation is different depending on whether the printing operation is performed in the single-sided printing mode or the duplex printing mode. The operation will be described below for each mode. First, referring to FIG. 3A, the printing operation in the single-sided printing mode is described. In FIG. 3A, a thick solid line represents a conveying path along which a sheet fed from the sheet feeding unit 1 is conveyed to the output tray 12. After the sheet fed from the sheet feeding unit 1 is processed by the decurling unit 2 and the skew correcting unit 3, the printing unit 4 performs printing on the first side of the sheet. The printed sheet is passed through the inspecting unit 5 and cut at every predetermined length by the cutting unit 6. The information recording unit 7 records print information on the back side of the cut sheets as required. The cut sheets are conveyed one by one to the drying unit 8 and dried thereby. Thereafter, the cut sheets are passed through the discharge conveying unit 10 and discharged sequentially onto trays 12 of the sorting unit 11. The discharged sheets are put one on another on the trays 12.

Figure 3B:
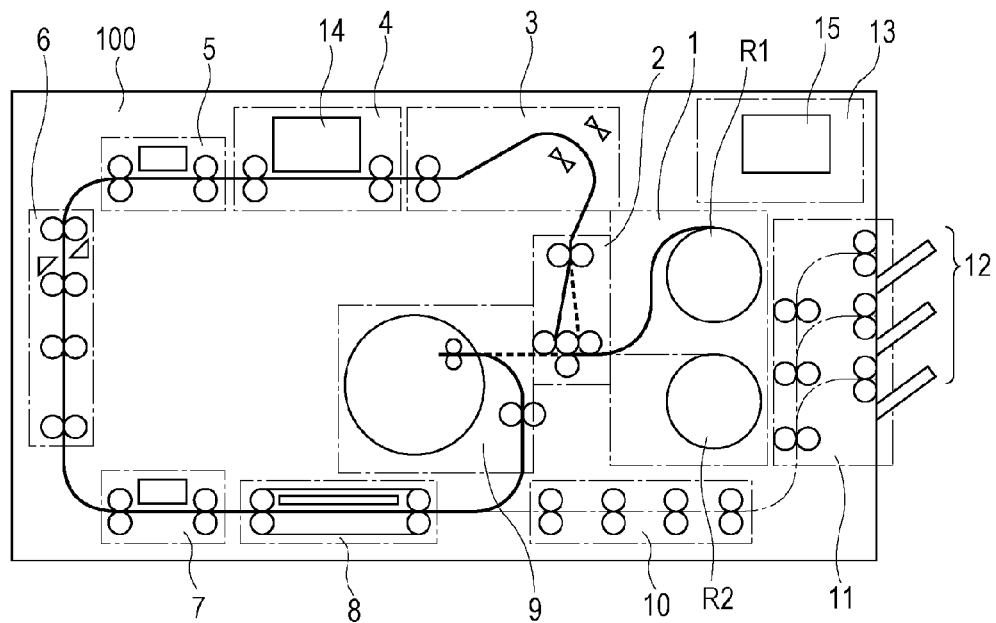

Next, referring to FIG. 3B, the printing operation in the duplex printing mode is described below. In the duplex printing mode, a back-side printing sequence is performed following a first-sided printing sequence. In the first-side printing sequence, operations performed by units from the sheet feeding unit 1 to the inspecting unit 5 are similar to the operations in the single-sided printing mode described above. The sheet in the form of the continuous sheet is then conveyed to the drying unit 8 without being subjected to the cutting process by the cutting unit 6. After the ink on the first side is dried by the drying unit 8, the sheet is conveyed not to a path toward the discharge conveying unit 10 but into a path toward the sheet winding unit 9. In the sheet winding unit 9, the conveyed sheet is wound around the winding drum rotating in a forward direction (in a counterclockwise direction in FIG. 3B). If the printing on the first side by the printing unit 4 is completed, then the cutting unit 6 cuts the continuous sheet at a trail end of the printed area. The part (printed part) of the continuous sheet located downstream with respect to the cut end is passed through the drying unit 8 and wound by the sheet winding unit 9 until the trailing end (the cut end) is taken therein. On the other hand, a part of the continuous sheet located upstream from the cut end is rewound into the sheet feeding unit 1 such that the leading end (cut end) does not remain in the decurling unit 2. Thus, the first-side printing sequence is complete.

After the first-side printing sequence is complete, the back-side printing sequence starts. In the back-side printing sequence, first, the winding drum of the sheet winding unit 9 rotates in a direction (in a clockwise direction in FIG. 3B) opposite to the winding direction. The leading end (the trail end in the winding process is now the leading end) of the wound sheet is drawn and conveyed to the decurling unit 2. The decurling unit 2 performs a curl correction process in a direction opposite to the direction in the first-side printing sequence because the sheet has been wound around the winding drum in an upside down fashion relative to the state in which the sheet was wound in the form of the roll in the sheet feeding unit 1, which causes the sheet to be curled into an opposite direction. The sheet is then passed through the skew correcting unit 3 and is conveyed to the printing unit 4. In the printing unit 4, printing on the back side of the continuous sheet is performed. After the printing is complete, the sheet is passed through the inspecting unit 5 and is conveyed to the cutting unit 6. In the cutting unit 6, the sheet is cut at every predetermined length. Because the cut sheet has been subjected to printing on both sides, the information recording unit 7 records nothing. The cut sheets are then passed one by one through the drying unit 8 and further passed through the discharge conveying unit 10 and sequentially discharged onto the tray 12 of the sorting unit 11. Thus, the back-side printing sequence is complete.

Next, the structure of the printing unit 4 is described. In the printing unit 4, seven recording heads corresponding to seven colors are disposed. The recording heads are similar in terms of the manner in which discharge ports (nozzles) are arranged, and thus the following description is given only for one recording head.

Figure 4:
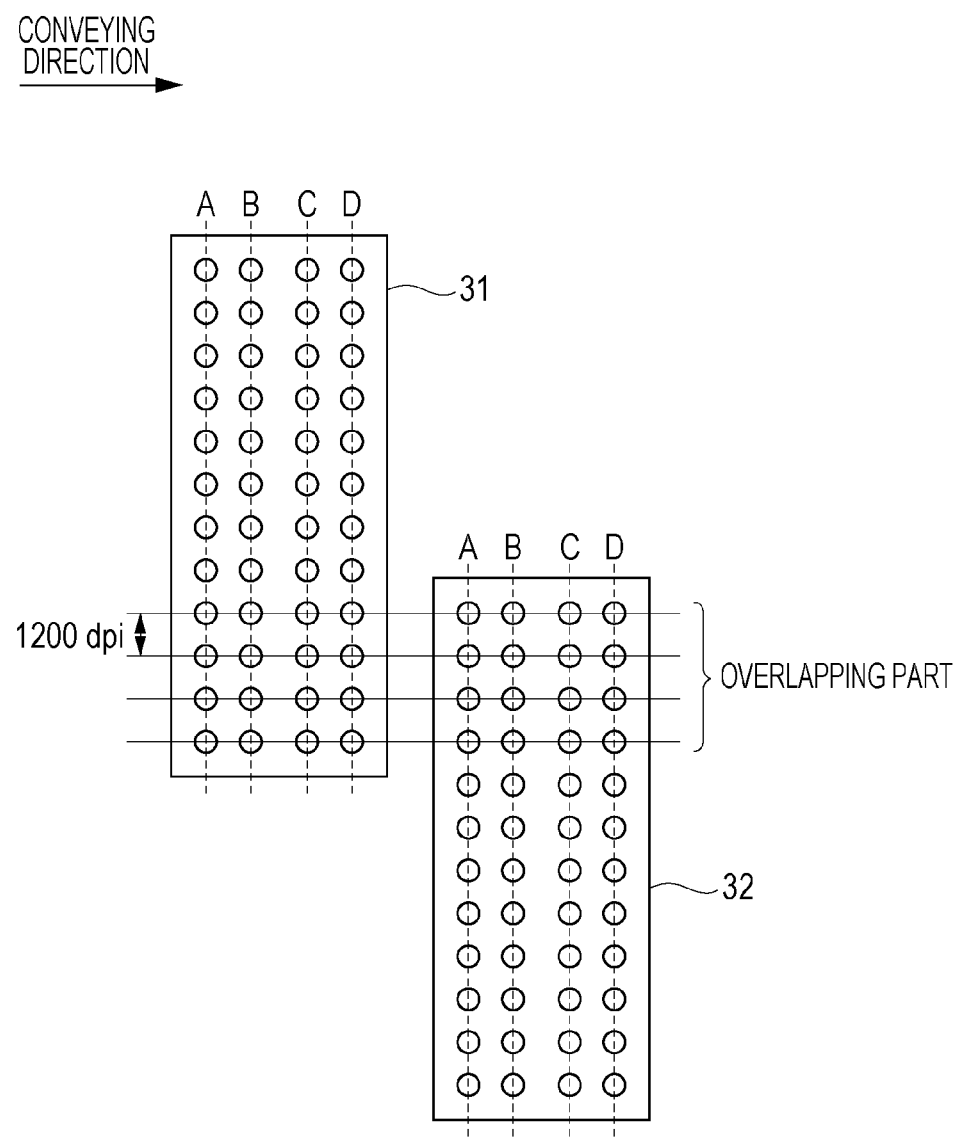
FIG. 4 is a schematic diagram illustrating a printing unit of an ink-jet recording apparatus.

FIG. 4 illustrates the manner in which nozzles are arranged in the recording head (multichip recording head) 14. In this recording head 14, a plurality of chips including a first chip 31 and a second chip 32 are arranged in a zig-zag fashion in a direction (crossing the conveying direction, in the present example). In each of the first chip 31 and the second chip 32, four nozzle arrays A to D are disposed side by side in the conveying direction. In each nozzle array, nozzles are disposed at nozzle-to-nozzle intervals of 1200 dpi. The first chip 31 and the second chip 32 are located such that they partially overlap each other. A part in which they overlap each other is referred to as an overlapping part.

Figure 5:
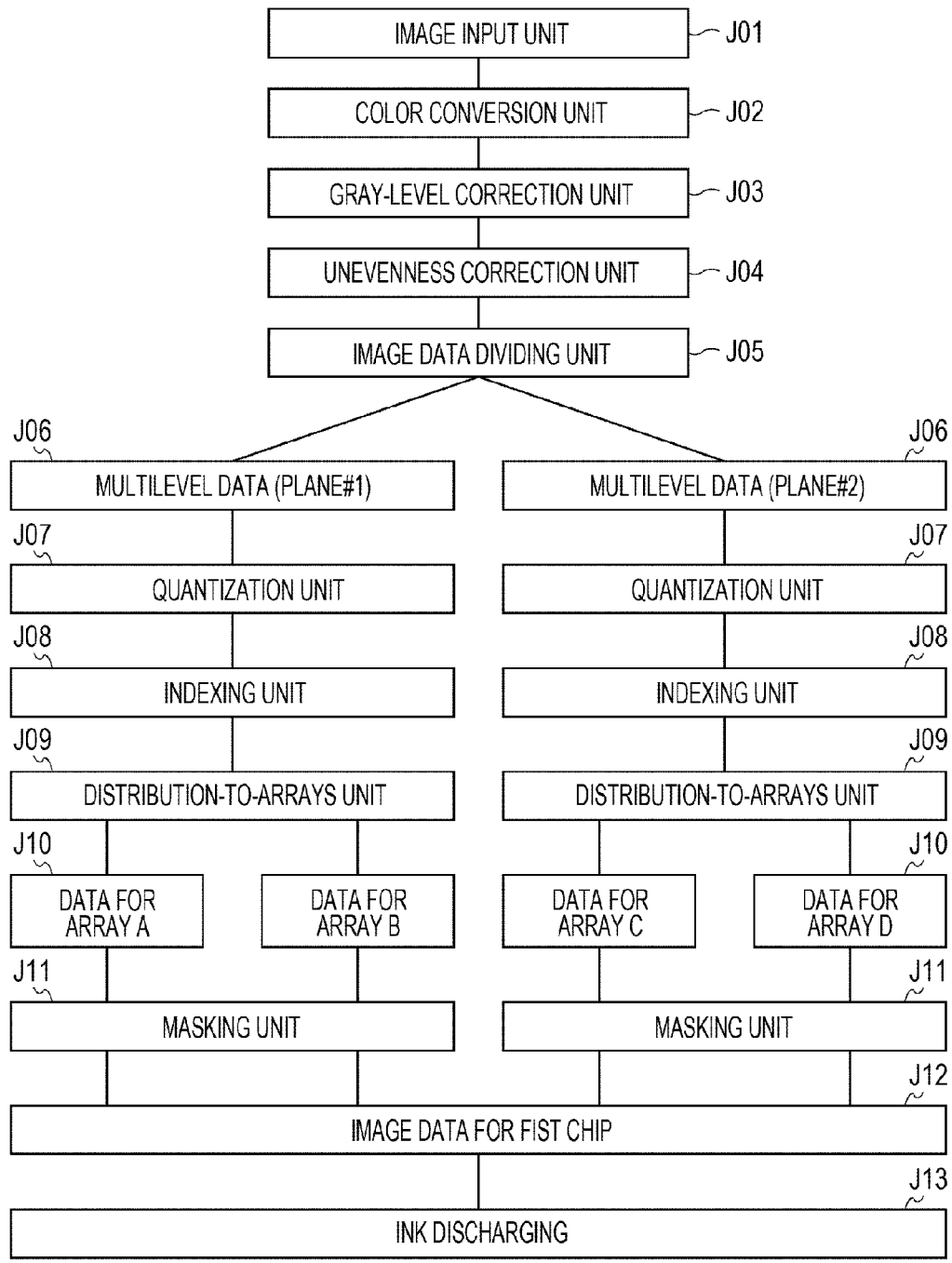
FIG. 5 is a diagram illustrating a process performed on image data according to an embodiment of the present invention.

FIG. 5 illustrates a process performed on image data. The process includes converting input multilevel image data into head driving data and discharging ink from nozzles of chips in accordance with the driving data. Note that the process shown in FIG. 5 is that associated with the first chip. The image processing associated with the second chip is similar to that associated with the first chip except for a masking process, and thus the process on image data is described below only as to the process associated with the first chip with reference to FIG. 5. Note that an indexing process described below may be performed differently for the first and second chips to adjust the similarity of dot patterns as described below.

First, multilevel image data to be recorded is input to an image input unit J01 from an external host apparatus or the like. In the present embodiment, for example, the input multilevel image data has a resolution of 600 dpi×600 dpi and represents luminance (R, G, B) of each pixel in 256 gray levels using 8 bits. A color conversion unit J02 converts the multilevel image data input to the image input unit J01 into multilevel density data corresponding to ink colors used in the recording apparatus. More specifically, in the present embodiment, the multilevel image data is converted into 256-level data expressed in 8 bits for each color. The following process performed thereafter is similar for all ink colors.

A gray level correction unit J03 performs a gray level correction on multilevel data separated into data corresponding to each color. An unevenness correction unit J04 converts values of multilevel ink color data according to a lookup table that defines conversions of multilevel data for each color so that evenness due to differences in characteristics among nozzles is corrected. An image data dividing unit J05 divides the multilevel ink color data into two pieces of data, i.e., data in plane #1 and data in plane #2. In the present example, the image data dividing unit J05 divides the multilevel ink color data in a dividing ratio of plane #1:plane #2=1:1 regardless of the value (gray level) of the multilevel ink color data.

A quantization unit J07 performs a quantization process on image data J06 in each plane divided by the image data dividing unit J05. In the quantization process, 128-level data in each plane is converted into data with lower gray levels, i.e., 8 levels in the present embodiment. An indexing unit J08 converts the multilevel image data with low gray levels output from the quantization unit J07 into binary data for each plane in accordance with an index table (a dot pattern). A distribution-to-arrays unit J09 distributes the binary data of 1200 dpi×1200 dpi indexed in the previous step among the nozzle arrays.

Next, a masking unit J11 performs a masking process on data in the overlapping part for each of data distributed to the nozzle arrays. By performing the sequence of processing steps described above, it is possible to finally obtain binary data (image data J12 for the first chip) according to which to control the arrays A to D of the first chip. Recording of an image in the overlapping part is performed by discharging ink (in J13) based on the image data J12 for the first chip.

Figure 6:
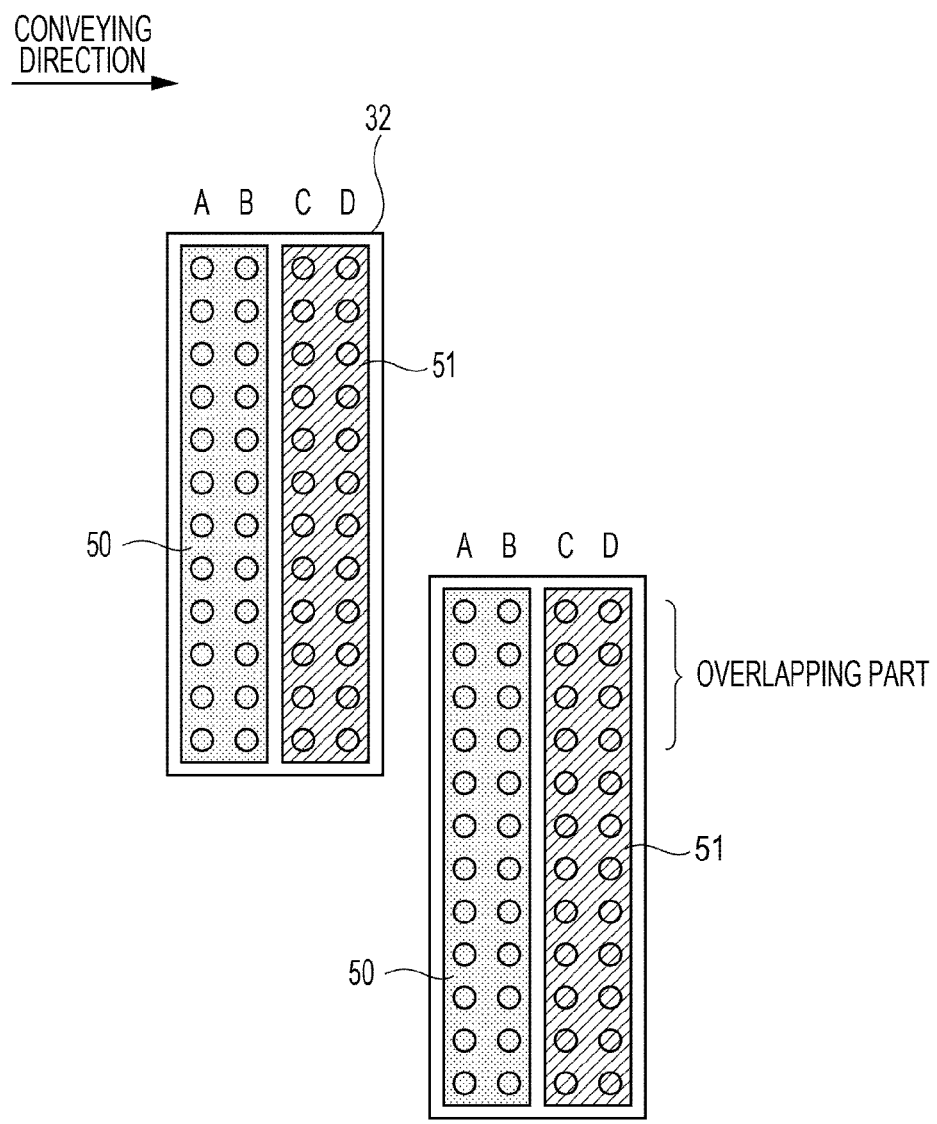
FIG. 6 is a diagram illustrating a method of distributing multilevel image data to nozzle arrays.

Next, referring to FIGS. 6, 7, 8A, 8B, 8C, 9, and 10, the image processing shown in FIG. 5 is described in further detail below. FIG. 6 illustrates a manner in which the multilevel image data divided by the image data dividing unit J05 is distributed to the respective nozzle arrays. As shown in FIG. 6, the image data 50 for the plane #1 included in the multilevel image data J06 is distributed to the array A and the array B. On the other hand, the image data 51 for the plane #2 is distributed to the array C and array D.

Figure 7:
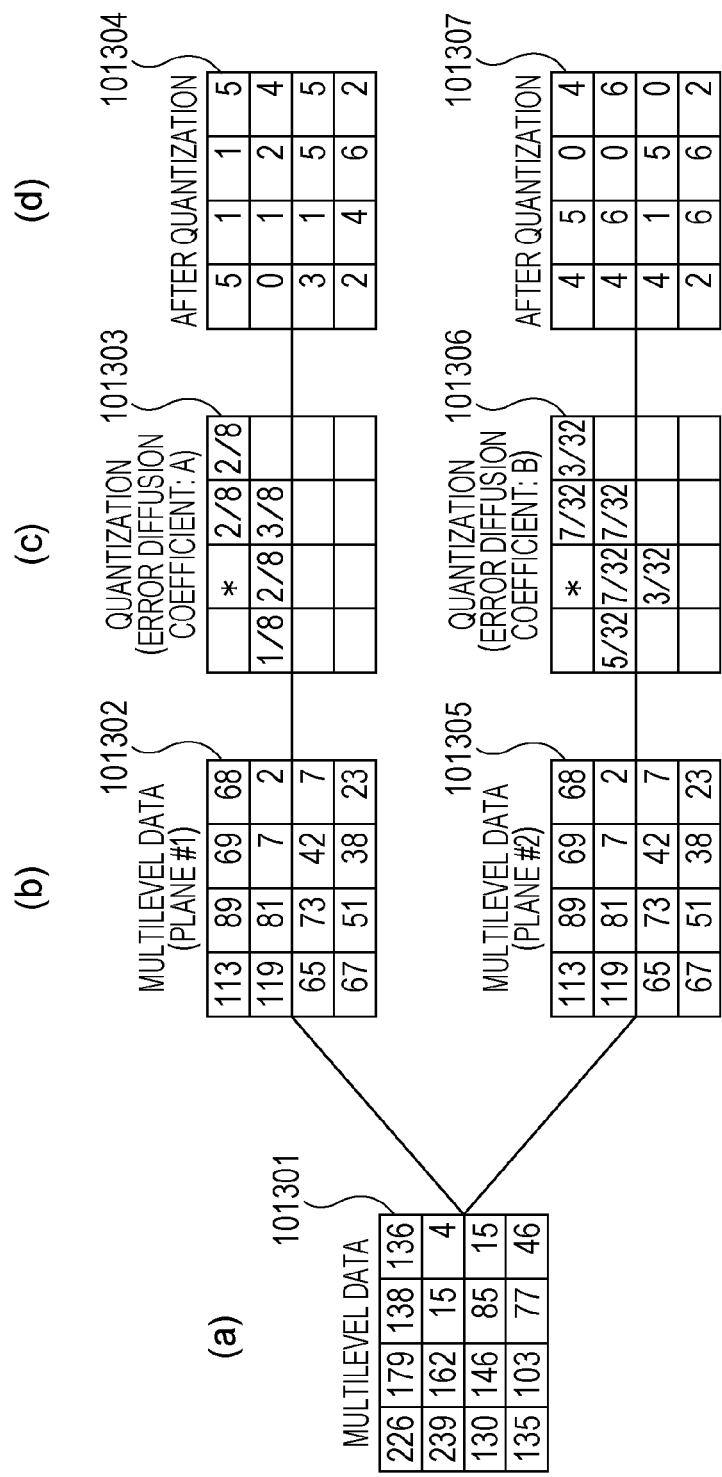
FIG. 7 is a diagram illustrating a specific example of a process performed by a quantization unit and other units.

FIG. 7 illustrates a specific example of the process performed by the image data dividing unit J05 and the quantization unit J07. In the example shown in FIG. 7, when multilevel image data (101301) to be recorded is input to the image data dividing unit J05, the input data is divided into two pieces of data. In this example, it is assumed that the multilevel image data (101301) includes 4 pixels×4 pixels with a resolution of 600 dpi×600 dpi. First, the image data dividing unit J05 divides the multilevel image data (101301) into multilevel image data (101302) for the plane #1 and multilevel image data (101305) for the plane #2 as shown in part (b) of FIG. 7. In this dividing process, the multilevel image data (101301) may be divided into two pieces for the respective planes not equally but in a particular dividing ratio depending on the gray levels of pixels in the multilevel image data (101301). More specifically, for example, data with low gray levels may be divided in a ratio of plane #1:plane #2=2:1, while data with high gray levels may be divided in a ratio of plane #1:plane #2=1:1. By employing a proper dividing ratio, it is possible to adjust the dot overlapping ratio between the plane #1 and the plane #2.

Next, as shown in part (c) of FIG. 7, the quantization unit J07 quantizes the multilevel image data (101302 and 101305) obtained via the dividing process performed by the image data dividing unit J05. The quantization is performed using an error diffusion algorithm. As a result of the quantization, the number of gray levels is decreased. In the present example, resultant quantized data is expressed in 8 levels.

As a result of the process described above, data (101304) with reduced gray levels for the plane #1 and data (101307) with reduced gray levels for the plane #2 are obtained as shown in part (d) of FIG. 7. Although the error diffusion algorithm is employed in the quantization in the present example, other algorithms may be used. The quantization may be performed differently for the two planes. In particular, for data with low gray levels, the quantization may be performed such that when the two planes are superimposed, the result includes both locations at which dots are overlapped and locations at which no overlapping occurs. For example, when the quantization is performed using the error diffusion algorithm, the threshold value or the error diffusion coefficient may be set to be different between the two planes such that different quantized values are given to the two planes for the same gray level of image data.

For example, as shown in FIG. 7, the multilevel data (101302) for the plane #1 is quantized by the error diffusion algorithm using an error diffusion coefficient A while the multilevel data (101305) for the plane #2 is quantized using an error diffusion coefficient B different from A so that locations of dots after the quantization are different between the planes. In FIG. 7, symbol * denotes pixels of interest.

Referring again to FIG. 5, the multilevel image data converted by the quantization unit J07 into image data with low gray levels is supplied to an indexing unit J08. The indexing unit binarizes the received image data for each plane according to an index table. In the present example, 8-level data with a resolution of 600 dpi×600 dpi is converted into 3-level image data with a resolution of 1200 dpi×1200 dpi. FIGS. 8A to 8C illustrate index tables used by the indexing unit J08. FIG. 8A illustrate 8-level signal values of the resolution of 600 dpi×600 dpi input to the indexing unit J07. FIGS. 8B and 8C illustrate index tables according to which the indexing unit J07 converts input data into data expressed in 3 gray levels with a resolution of 1200 dpi×1200 dpi. More specifically, FIG. 8B illustrates an index table for the plane #1, and FIG. 8C illustrates an index table for the plane #2. A numeric value in each box indicates the number of dots to be recorded in a unit area of 1200 dpi×1200 dpi. According to the index tables, 8-level image data with a resolution of 600 dpi×600 dpi input to the indexing unit J07 is converted into 3-level image data with a resolution of 1200 dpi×1200 dpi. The index tables may be equal or may be different for the two planes. The number of gray levels of data produced via the indexing process is not limited to 3, but the indexing process may convert the input data not into 3-level data but to, for example, 2-level data.

Referring again to FIG. 5, the 3-level data of 1200 dpi×1200 dpi obtained via the indexing process is supplied to a distribution-to-arrays unit J09. The distribution-to-arrays unit J09 distributes the received data among the nozzle arrays. In the present example, the distribution-to-arrays unit J09 distributes the data using a random mask or the like such that arrays have an equal number of dots.

Next, a masking unit J11 performs a masking process on data distributed in the respective arrays in the overlapping part. As a result, the data is thinned. FIG. 9 illustrates examples of masks employed in the present embodiment to perform the masking process on data in the overlapping part. A mask #1 (52) and a mask #3 (54) have an exclusive relationship in terms of dot locations, while a mask #2 (53) and a mask #4 (55) have a mutually exclusive relationship. Each mask has 4 pixels×4 pixels corresponding to 1200 dpi×1200 dpi, and the mask is employed repeatedly in the conveying direction. In these masks, solid boxes indicate pixels of "1" i.e., "ON", while open boxes indicate pixels of "0" i.e., "OFF".

Figure 10:
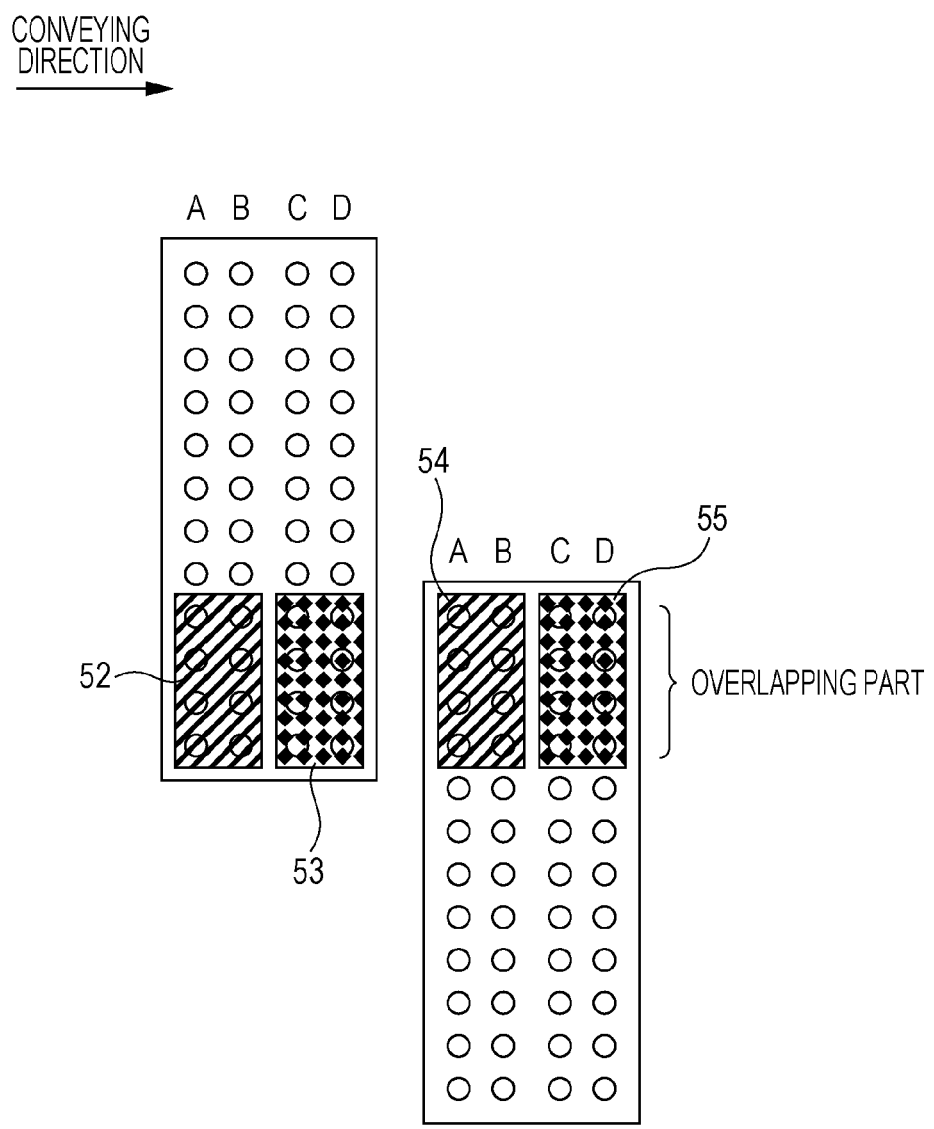
FIG. 10 is a diagram illustrating a masking process according to an embodiment of the present invention.

Referring to FIG. 10, the masking process according to the present embodiment is described in further detail below. In the masking process, masks described above with reference to FIG. 9 are applied to the arrays in the overlapping part. More specifically, the mask #1 (52) is applied to the array A and the array B of the first chip, while the mask #2 (53) is applied to the array C and the array D of the first chip. On the other hand, the mask #3 (54) is applied to the array A and the array B of the second chip, while the mask #4 (55) is applied to the array C and the array D of the second chip.

The present embodiment of the invention is characterized in that masks that are at least partially different from each other are applied to planes for the same chip so that locations of dots recorded by the first chip and locations of dots recorded by the second chip do not have a perfect exclusive relationship, but some dots overlap each other between the first and second chips while the other dots do not overlap each other between the first and second chips. Note that in the present embodiment different masks are used for the respective planes (i.e., for every two arrays) in each chip. However, masks may be set in different manners. For example, masks may be set such that masks may be different for each nozzle arrays, or masks may be set such that masks are different at least for one of nozzle arrays from the other nozzle arrays in each chip.

Referring to FIGS. 11A to 11E, the masking process for the first chip according to the present embodiment is described in further detail below. FIGS. 11A to 11D illustrate a manner in which data obtained as a result of the indexing process is converted via the masking process. FIG. 11E illustrates locations of dots recorded by the first chip and also illustrates the number of recorded dots. FIGS. 12A to 12E illustrate the details of the masking process for the second chip according to the present embodiment. Note that FIGS. 12A to 12E correspond to FIGS. 11A to 11E.

As can be seen from FIG. 11E and FIG. 12E, some dots overlap each other but the other dots do not overlap between the first and second chips.

Figure 13A:
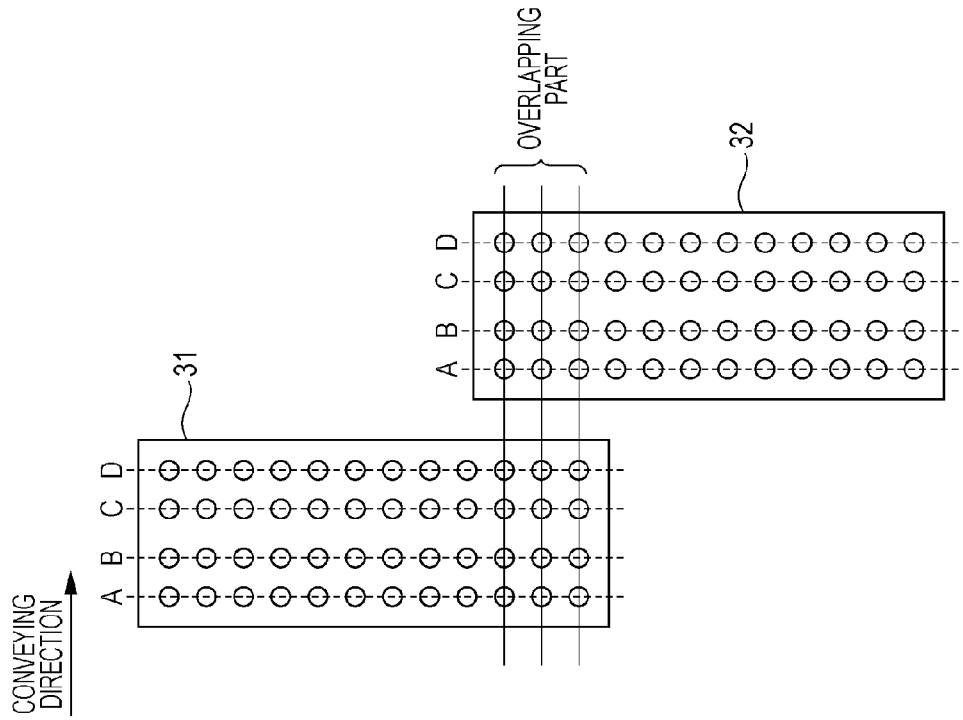
FIGS. 13A and 13B are diagrams illustrating a registration error between chips.
Figure 13B:
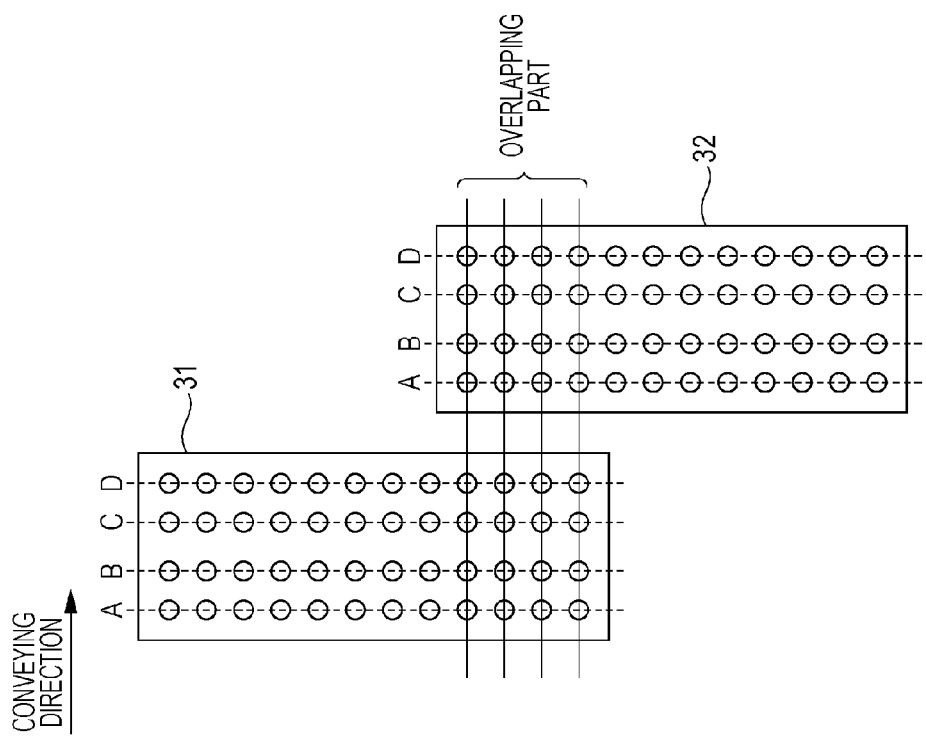
Figures 14A, 14B:
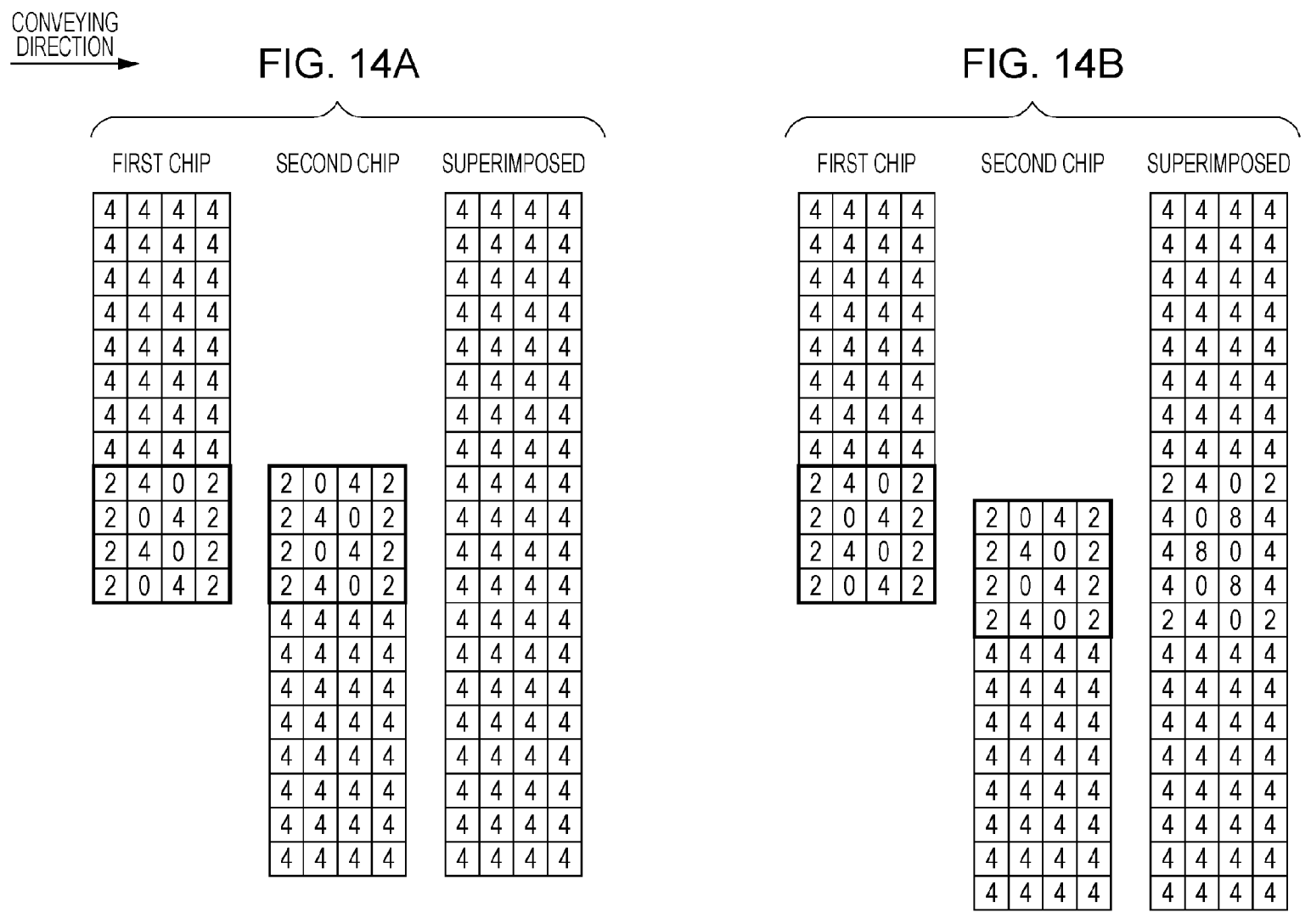

Referring to FIGS. 13A and 13B, effects of a registration error between chips are described below. FIG. 13A illustrates two chips having no registration error, while FIG. 13B illustrates two chips having a registration error. FIGS. 14A and 14B illustrate locations of recorded dots for both cases corresponding to FIGS. 13A and 13B, i.e., for the case where there is a registration error and a case where there is no registration error. In the case where there is no registration error between chips as shown in FIG. 13A, dots are recorded at locations on paper as shown in FIG. 14A. That is, FIG. 14A shows dots recorded by the first chip, dots recorded by the second chip, and dots obtained by superposition of the dots recorded by the first and second chips. A numeric value in each box indicates the number of dots recorded per square area of 1200 dpi×1200 dpi.

On the other hand in the case where there is a registration error between chips as shown in FIG. 13B, dots are recorded at locations on paper as shown in FIG. 14B. In the example shown in FIG. 13B, it is assumed that there is a registration error corresponding to a shift of one pixel with a resolution of 1200 dpi in a direction (a direction in which nozzles are arranged) perpendicular to the conveying direction.

FIG. 14B illustrates locations of dots recorded for the case where there is such a registration error between the first and second chips. That is, FIG. 14B illustrates locations of dots recorded when there is a registration error such as that shown in FIG. 13B. A numeric value in each box indicates the number of dots per square area of 1200 dpi×1200 dpi. In FIG. 14B showing locations of dots obtained as a result of superposition between the dots recorded by the first chip and the dots recorded by the second chip, it is shown that the mutually exclusive relationship in terms of dot locations between the first chip and the second chip becomes imperfect, and the imperfect exclusive relationship causes dots to be incorrectly overlapped between the first and second chips and causes locations to incorrectly have no recorded dots (i.e., areas having no dots are created). In this case, incorrect overlapping, which will not occur if there is no registration error, occurs at some locations between dots recorded in the first path and dots recorded in the second path, while necessary overlapping does not occur between the first and second paths, which is to be produced if there is no registration error. This means that even if a registration error between chips occurs, the registration error does not cause a significant change in the surface coverage ratio of dots on paper. That is, when the image formed by dots is viewed over an area with a relatively large size, a significant change in image density does not occur in the overlapping part. Thus, it is possible to suppress the change in image density due to a chip positioning error, a head positioning error, a paper conveying fluctuation, etc.

As discussed in Japanese Patent Laid-Open No. 2000-103088, to suppress the change in density due to impact position errors of ink droplets caused by various factors, it is effective to avoid a perfect exclusive relationship in locations of dots recorded via a plurality of recording paths, i.e., it is effective to record dots such that overlapping of dots at some pixels occurs via recording via the plurality of recording paths. In particular, in the case where recording is performed by the one path scheme using the multichip recording head, it is effective to overlap dots between chips to suppress the change in density. In the present embodiment, in view of the above, masks are configured such that the masks are at least partially different among nozzle arrays or among planes so that dots are overlapped between chips.

In the present embodiment, as described above, overlapping of dots between the two chips is produced to suppress the change in density even in a state where there is a registration error in the overlapping part between the two chips. In the present embodiment, to produce overlapping of dots between two chips, masks are set to be at least partially different between planes in the same chip. Note that masks being at least partially different refer to masks that define locations of pixels at which dots are allowed to be recorded such that the masks are different at least at one pixel. By employing such masks, it is possible to achieve an imperfect exclusive relationship in terms of locations of dots between the first and second chips such that dots overlap each other at some locations between the first and second chips and dots do not overlap at some locations.

In the present embodiment, masks are different for planes (for every two arrays) in the same chip. Alternatively, for example, masks may be different among nozzle arrays.

It is not necessary to use masks that are partially different among planes in the same chip to produce overlapping of dots between different chips at all gray levels. For example, at the lowest gray level or low gray levels close to the lowest gray level, original data includes a small number of overlapped dots. In contrast, at rather high gray levels, original data includes a large number of overlapped dots, and thus a change in image density does not lead to a significant influence compared to lower gray levels. Therefore, for high gray levels, the same mask may be used for a plurality of planes of the same chip.

If overlapping of dots between chips occurs at too many pixels, a significant increase in image density (that can appear in the form of a black streak) can occur due to a large increase in surface coverage ratio of dots on paper caused by a registration error, or degradation in granular quality can occur due to overlapping of too many dots. This situation can be avoided as follows. That is, when masks are used that are at least partially different among arrays or planes, the overlapping ratio of dots between chips may be adjusted by adjusting the similarity of masks. The similarity between two masks is defined as the ratio of the number of pixels at which dots are allowed to be recorded in both masks relative to the total number of pixels.

By adjusting the similarity between the index tables for the plane #1 and the plane #2, it is possible to adjust the dot overlapping ratios of the chips for each gray level. Note that the similarity between two index tables is defined by the ratio of the number of pixels at which dots are placed in both tables relative to the total number of pixels. By adjusting the similarity of masks or the similarity of index tables, it is possible to adjust the ratio of overlapping dots between different chips.

The mask patterns applied to the overlapping part may be determined based on the technique associated with the gradation mask disclosed in Japanese Patent Laid-Open No. 5-57965. The gradation masks refers to masks that cause the recording density to gradually decrease toward one end of the overlapping part in one of the two chips and gradually increase toward the one end of the overlapping part in the other one of the two chips. The recording density corresponds to the record allowance ratio defined by the masks or the like.

In the above description of the image processing apparatus configured to perform the image processing according to the embodiments described above, it is assumed by way of example that the image processing apparatus is the recording apparatus (image forming apparatus) including the controller 15 having the function of performing the image process. However, the present invention is not limited to such a recording apparatus. For example, the image processing according to the present invention may be performed by a host apparatus (an external device 16) having a printer driver installed therein. In this case, the host apparatus (the external device) connected to the recording apparatus functions as an image processing apparatus according to the present invention. A part of the process from the start to the quantization may be performed by the host apparatus, and the remaining part of the process from the indexing may be performed by the recording apparatus.

In the embodiments described above, it is assumed that the recording apparatus is of the full line type in which the multichip recording head including arrays of nozzles (discharge ports) arranged over the length corresponding to the whole width of paper is fixed, while the paper is conveyed in the direction crossing the direction in which nozzles (discharge ports) are arranged. However, the present invention is not limited to such a recording apparatus. For example, the present invention may be applied to a serial type recording apparatus configured to scan a multichip recording head in a direction crossing a direction in which nozzles (discharge ports) are arranged while conveying paper (recording medium) in the same direction as the direction in which nozzles (discharge ports) are arranged.

Comparative Example

Figure 15:
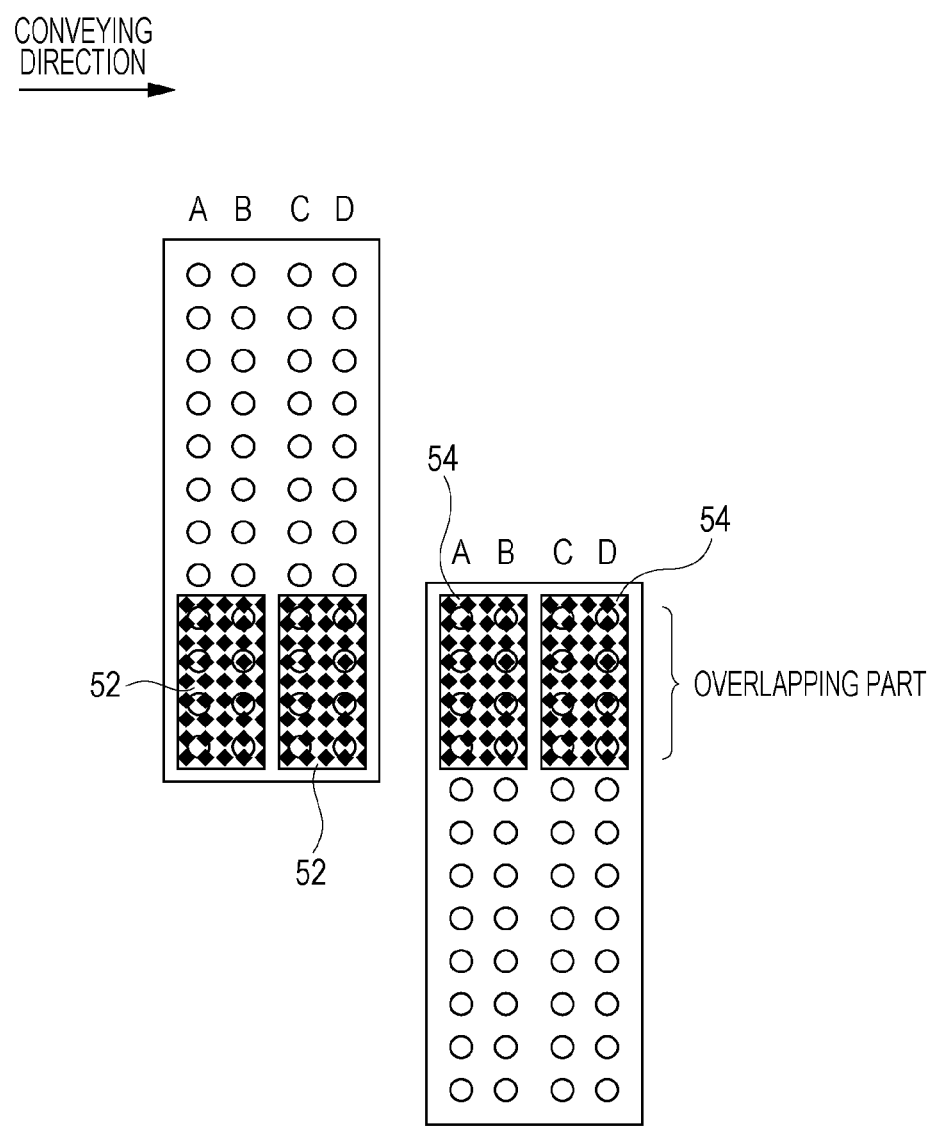
FIG. 15 is a diagram illustrating a masking manner in a comparative example.

For better understanding of advantages provided by the embodiments of the present invention, a description is given below as to a comparative example in which the same mask is applied to all nozzle arrays of each chip. FIG. 15 is a diagram illustrating a manner of using masks in the comparative example, in which the masks shown in FIG. 9 are applied to respective arrays in the overlapping part. More specifically, the mask #1 (52) is applied to arrays A to D of the first chip, while the mask #3 (54) is applied to arrays A to D of the second chip. Note that in the comparative example, all arrays of each chip are assigned the same mask. This causes the dots to be recorded at locations completely exclusive between the first and second chips, and thus overlapping of dots between chips does not occur at any location.

FIGS. 16A to 16E are diagrams illustrating a masking process associated with a first chip in a comparative example. FIGS. 16A to 16D illustrate a manner in which data obtained as a result of the indexing process is converted via the masking process. FIG. 16E illustrates locations of dots recorded by the first chip and also illustrates the number of dots recorded. FIGS. 17A to 17E illustrate a masking process associated with a second chip in the comparative example. Note that FIGS. 17A to 17E correspond to FIG. 11A to FIG. 11E. As can be seen from FIG. 16E and FIG. 17E, there are no dots that overlap each other between the first and second chips.

FIGS. 18A and 18B illustrate locations of dots recorded for a case where there is no registration error between the first and second chips and for a case where there is a registration error. More specifically, FIG. 18B illustrates locations of dots recorded in the case where there is a registration error such as that shown in FIG. 13B between the first and second chips. A numeric value in each box indicates the number of dots per square area of 1200 dpi×1200 dpi.

In FIG. 18B showing locations of dots obtained as a result of superposition between the dots recorded by the first chip and the dots recorded by the second chip, it can be seen that there is a perfect exclusive relationship in dot locations between the first chip and the second, and the perfect exclusive relationship causes many locations to have no recorded dots in both first and second chips, as indicated by "0" in boxes. This is because the registration error causes overlapping to occur between dots that would be recorded by the first and second chips without overlapping if there were no registration error, while no dots are recorded at locations at which dots would be recorded in an overlapping manner if there were no registration error. That is, the registration error between chips causes a significant reduction in surface coverage ratio of dots on paper. That is, when the image formed by dots is viewed over an area with a relatively large size, a significant change in image density occurs in the overlapping part.

Second Embodiment

Next, a second embodiment of the present invention is described below. Similar parts to those in the first embodiment are denoted by similar reference numerals and a further description thereof is omitted. The second embodiment is different from the first embodiment in that the process of dividing image data is not performed.

Figure 19:
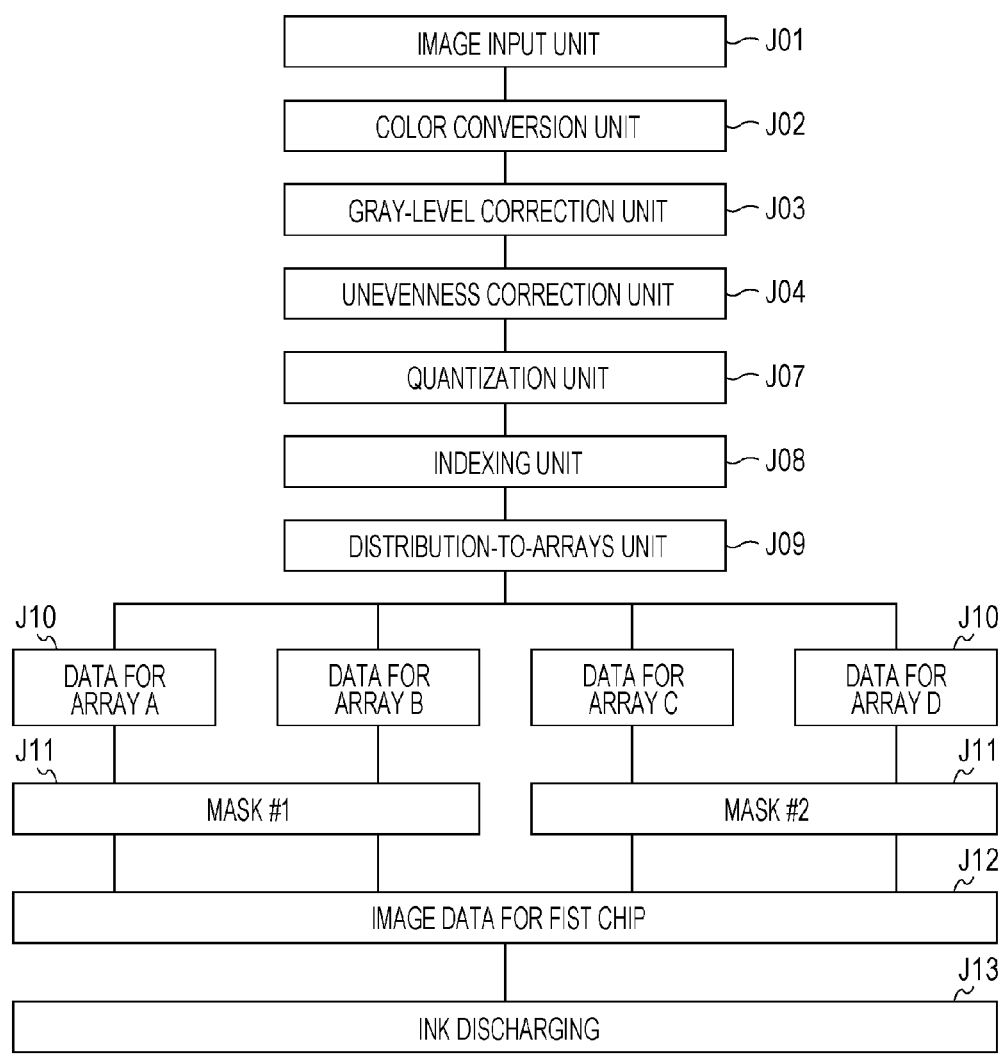
FIG. 19 is a diagram illustrating a process performed on image data according to an embodiment of the present invention.

FIG. 19 illustrates a process performed on image data. The process includes converting input multilevel image data into head driving data and discharging ink from nozzles of chips in accordance with the driving data. Note that the process shown in FIG. 19 is that associated with the first chip.

In the flow chart shown in FIG. 19, processing steps performed by units from the image input unit J01 to the unevenness correction unit J04 and processing steps performed by units from the indexing unit J08 to the masking unit J11 are similar to those in the first embodiment, and thus a description thereof is omitted.

The second embodiment is different from the first embodiment in that the process of dividing image data by the image data dividing unit J05 is not performed in the second embodiment. More specifically, in the first embodiment described above, after the process by the unevenness correction unit J04 is completed, the multilevel image data is divided into two pieces corresponding to two planes, and each pieces of data is separately quantized. In contrast, in the present embodiment, the multilevel image data is directly quantized without being divided. In the present embodiment, because dividing of image data is not performed, it is possible to reduce the processing load on the image processing compared with the first embodiment described above.

Also in the present embodiment, as with the first embodiment, it is possible to produce overlapping of dots between chips by using masks that are at least partially different among arrays thereby achieving a reduction in change in image density in the overlapping part due to a registration error between chips. However, the first embodiment provides a greater suppression of degradation in granular quality due to a registration error than the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-144214 filed Jun. 24, 2010, which is hereby incorporated by reference herein in its entirety.

What is claimed is:

1. An image processing apparatus configured to process input image data used in recording an image on a recording medium by using a recording head while moving a relative position between the recording head and the recording medium, the recording head including a first chip and a second chip for the same color each including a first nozzle array and a second nozzle array from which to discharge ink for forming a dot on the recording medium, the first chip and the second chip being disposed such that there is an overlapping part where a position of the first chip and a position of the second chip overlap each other in a direction in which nozzles are arranged, the processing being performed on image data associated with the overlapping part and the relative position between the recording head and the recording medium is moved in crossing direction crossing the direction in which nozzles are arranged, the image processing apparatus comprising:

an obtaining unit configured to obtain first dot data for recording by the first nozzle arrays of the overlapping part in both of the first and second chips and second dot data for printing by the second nozzle arrays of the overlapping part in both of the first and second chips, wherein the first dot data and the second dot data are data based on the input image data; and a distributing unit configured to distribute the first dot data obtained by the obtaining unit to the first nozzle array of the first chip and the first nozzle array of the second chip and to distribute the second dot data obtained by the obtaining unit to the second nozzle array of the first chip and the second nozzle array of the second chip using, for the first and second nozzle arrays in the first chip and the first and second arrays in the second chip, mask patterns each indicating pixels allowed to be recorded in a unit area of the recording medium on which recording is performed using nozzles positioned in the overlapping part and pixels not allowed to be recorded in the unit area, wherein, in terms of an arrangement of pixels allowed to be recorded, there is a complementary relationship between a mask pattern used for recording using the first nozzle array included in the first chip and a mask pattern used for recording using the first nozzle array included in the second chip, and there is a complementary relationship between a mask pattern used for recording using the second nozzle array included in the first chip and a mask pattern used for recording using the second nozzle array included in the second chip, and wherein the mask pattern for the first nozzle array in the first chip are different from each of the mask patterns for the second nozzle array in the first chip and the mask patterns for the second nozzle array in the second chip are different from each other in terms of an arrangement of pixels allowed to be recorded.

2. The image processing apparatus according to claim 1, further comprising:

a dividing unit configured to divide the input image data to be applied to the overlapping part into pieces of multilevel image data for the same color corresponding to the first nozzle arrays in both of the first and second chips and the second nozzle arrays in both of the first and second chips respectively, and a generating unit configured to generate the first dot data and the second dot data to be obtained by the obtaining unit by lowering gray levels of the pieces of multilevel image data divided by the dividing unit respectively so that an arrangement of dots of the first dot data are different from an arrangement of dots of the second dot data and wherein the generating unit includes, an assigning unit configured to assign a dot pattern to each of the pieces of multilevel data with lower gray levels, depending on the gray levels thereof.

3. The image processing apparatus according to claim 1, wherein the distributing unit distributes the first dot data to the first nozzle using a mask pattern that causes the recording density to gradually decrease toward one end of the overlapping part in one of the two chips and gradually increase toward the one end of the overlapping part in the other one of the two chips.

4. The image processing apparatus according to claim 2, wherein the generating unit generates the first and second dot data by error diffusion process for lowering gray levels of the pieces of multilevel image data respectively so that an error diffusion coefficient for generating the first dot data is different from an error diffusion coefficient for generating the second dot data.

5. The image processing apparatus according to claim 2, wherein the assigning unit assigns the dot pattern to each of the pieces of multilevel data so that the dot pattern corresponding to a predetermined gray level of the piece of multilevel data with lower gray level for generating the first dot data is different from the dot pattern corresponding to a predetermined gray level of the piece of multilevel data with lower gray level for generating the second dot data.

6. The image processing apparatus according to claim 1, wherein the recording medium being recorded is conveyed in the crossing direction.

7. The image processing apparatus according to claim 1, the further comprising the recording head configured to record on the recording medium according to the distributed first dot data and the distributed second data by the distributing unit.

8. An image processing apparatus configured to process input image data used in recording an image on a recording medium by using a recording head while moving a relative position between the recording head and the recording medium, the recording head including a first chip and a second chip for the same color each including a first nozzle array and a second nozzle array from which to discharge ink for forming a dot on the recording medium, the first chip and the second chip being disposed such that there is an overlapping part where a position of the first chip and a position of the second chip overlap each other in a direction in which nozzles are arranged, the processing being performed on image data associated with the overlapping part and the relative position between the recording head and the recording medium is moved in crossing direction crossing the direction in which nozzles are arranged, the image processing apparatus comprising:

an obtaining unit configured to obtain first dot data for recording by the first nozzle arrays of the overlapping part in both of the first and second chips and second dot data for printing by the second nozzle arrays of the overlapping part in both of the first and second chips, wherein the first dot data and the second dot data are data based on the input image data; and a distributing unit configured to distribute the first dot data obtained by the obtaining unit to the first nozzle array of the first chip and the first nozzle array of the second chip and to distribute the second dot data obtained by the obtaining unit to the second nozzle array of the first chip and the second nozzle array of the second chip using, for the first and second nozzle arrays in the first chip and the first and second arrays in the second chip, mask patterns each indicating pixels allowed to be recorded in a unit area of the recording medium on which recording is performed using nozzles positioned in the overlapping part and pixels not allowed to be recorded in the unit area, wherein, in terms of an arrangement of pixels allowed to be recorded, there is a complementary relationship between a mask pattern used for recording using the first nozzle array included in the first chip and a mask pattern used for recording using the first nozzle array included in the second chip, and there is a complementary relationship between a mask pattern used for recording using the second nozzle array included in the first chip and a mask pattern used for recording using the a second nozzle array included in the second chip, and wherein the mask pattern for the first nozzle array in the first chip and a mask pattern used for the second nozzle array in the second chip are different from each other in terms of an arrangement of pixels allowed to be recorded such that a part of the pixels allowed to be recorded in the mask pattern for the first nozzle array in the first chip is allowed to be recorded in the mask pattern for the second nozzle array in the second chip and other part of the pixels allowed to be recorded in the mask pattern for the first nozzle array in the first chip is not allowed to be recorded in the mask pattern for the second nozzle array in the second chip.

9. The image processing apparatus according to claim 8, further comprising:

a dividing unit configured to divide the input image data to be applied to the overlapping part into pieces of multilevel image data for the same color corresponding to the first nozzle arrays in both of the first and second chips and the second nozzle arrays in both of the first and second chips respectively, and a generating unit configured to generate the first dot data and the second dot data to be obtained by the obtaining unit by lowering gray levels of the pieces of multilevel image data divided by the dividing unit respectively so that an arrangement of dots of the first dot data are different from an arrangement of dots of the second dot data and wherein the generating unit includes, an assigning unit configured to assign a dot pattern to each of the pieces of multilevel data with lower gray levels, depending on the gray levels thereof.

10. The image processing apparatus according to claim 8, wherein the distributing unit distributes the first dot data to the first nozzle using a mask pattern that causes the recording density to gradually decrease toward one end of the overlapping part in one of the two chips and gradually increase toward the one end of the overlapping part in the other one of the two chips.

11. The image processing apparatus according to claim 9, wherein the generating unit generates the first and second dot data by error diffusion process for lowering gray levels of the pieces of multilevel image data respectively so that an error diffusion coefficient for generating the first dot data is different from an error diffusion coefficient for generating the second dot data.

12. The image processing apparatus according to claim 9, wherein the assigning unit assigns the dot pattern to each of the pieces of multilevel data so that the dot pattern corresponding to a predetermined gray level of the piece of multilevel data with lower gray level for generating the first dot data is different from the dot pattern corresponding to a predetermined gray level of the piece of multilevel data with lower gray level for generating the second dot data.

13. The image processing apparatus according to claim 8, wherein the recording medium being recorded is conveyed in the crossing direction.

14. The image processing apparatus according to claim 8, the further comprising the recording head configured to record on the recording medium according to the distributed first dot data and the distributed second data by the distributing unit.

* * * * *